(12) United States Patent
Matsuura et al.

(10) Patent No.: US 11,797,791 B2
(45) Date of Patent: Oct. 24, 2023

(54) READING APPARATUS

(71) Applicant: NEC Platforms, Ltd., Kanagawa (JP)

(72) Inventors: Hideki Matsuura, Kanagawa (JP); Yuta Imai, Tokyo (JP)

(73) Assignee: NEC Platforms, Ltd., Kanagawa (JP)

( * ) Notice: Subject to any disclaimer, the term of this patent is extended or adjusted under 35 U.S.C. 154(b) by 17 days.

(21) Appl. No.: 17/622,975

(22) PCT Filed: Mar. 17, 2020

(86) PCT No.: PCT/JP2020/011826
§ 371 (c)(1),
(2) Date: Dec. 27, 2021

(87) PCT Pub. No.: WO2021/002065
PCT Pub. Date: Jan. 7, 2021

(65) Prior Publication Data
US 2022/0269873 A1    Aug. 25, 2022

(30) Foreign Application Priority Data
Jul. 3, 2019   (JP) .................. 2019-124183

(51) Int. Cl.
*G06K 7/10*    (2006.01)
*H01Q 15/14*   (2006.01)
*H01Q 15/24*   (2006.01)

(52) U.S. Cl.
CPC ..... *G06K 7/10366* (2013.01); *G06K 7/10316* (2013.01); *H01Q 15/14* (2013.01); *H01Q 15/24* (2013.01)

(58) Field of Classification Search
CPC ........... G06K 7/10366; G06K 7/10316; H01Q 15/14; H01Q 15/24
(Continued)

(56) References Cited

U.S. PATENT DOCUMENTS 6,010,075 A     1/2000  Ishifuji et al.
2009/0015381 A1 1/2009  Mochida
(Continued)

FOREIGN PATENT DOCUMENTS

JP    2008-221499 A    9/2008
JP    2008-254865 A   10/2008
(Continued)

OTHER PUBLICATIONS

International Search Report for PCT Application No. PCT/JP2020/011826, dated Jun. 23, 2020.
(Continued)

*Primary Examiner* — Jamara A Franklin
(74) *Attorney, Agent, or Firm* — Sughrue Mion, PLLC

(57) ABSTRACT

Provided is a reading apparatus capable of efficiently reading information from an RFID tag. A reading apparatus (1) includes at least one antenna (2) and a casing (10). The casing (10) has reflective surfaces (12) in at least a part of the inner side. The antenna (2) is provided in the casing (10), and is used to read information from an RFID tag. The antenna (2) is disposed in the vicinity of reflective surfaces (12A) and (12B) having two or more normal lines (N1) and (N2) at different angles, and radiates electromagnetic waves toward at least a direction that is not parallel to the directions of the normal lines (N1) and (N2).

4 Claims, 7 Drawing Sheets

(58) Field of Classification Search
USPC .......................................................... 235/451
See application file for complete search history.

(56) References Cited

U.S. PATENT DOCUMENTS

2016/0117530 A1    4/2016  Roth
2017/0323128 A1*  11/2017  Jaffri .................... G06K 7/0004
2018/0053022 A1    2/2018  Murofushi
2019/0108373 A1    4/2019  Ito et al.
2019/0138772 A1    5/2019  Sakurai

FOREIGN PATENT DOCUMENTS

| JP | 2008-288784 A | 11/2008 |
| JP | 2009-003560 A | 1/2009 |
| JP | 2009-093434 A | 4/2009 |
| JP | 2018-028849 A | 2/2018 |
| JP | 6469758 B | 2/2019 |
| JP | 2019-087137 A | 6/2019 |
| WO | 98/21691 A1 | 5/1998 |
| WO | 2012/086412 A1 | 6/2012 |
| WO | 2018/116700 A1 | 6/2018 |

OTHER PUBLICATIONS

Office Action for Application No. JP2019-124183, dated Aug. 3, 2021 with English Translation.
Office Action for Application No. JP2019-124183, dated Oct. 19, 2021 with English Translation.

* cited by examiner

READING APPARATUS

This application is a National Stage Entry of PCT/JP2020/011826 filed on Mar. 17, 2020, which claims priority from Japanese Patent Application 2019-124183 filed on Jul. 3, 2019, the contents of all of which are incorporated herein by reference, in their entirety.

TECHNICAL FIELD

The present invention relates to a reading apparatus and particularly to a reading apparatus that reads information from a radio frequency identification (RFID) tag.

BACKGROUND ART

Apparatuses that read information from an RFID tag have been proposed. For example, Patent Literature 1 discloses a wireless tag reader/writer antenna that efficiently shields electromagnetic waves harmful to the communication with a wireless tag. The wireless tag reader/writer antenna according to Patent Literature 1 includes an antenna exterior that accommodates a reader/writer antenna that is an antenna for transmitting and receiving electromagnetic waves to and from the wireless tag, and a plurality of electromagnetic-wave shielding plates. The plurality of electromagnetic-wave shielding plates are installed on the antenna exterior so as to sandwich the antenna exterior therebetween, and extend toward the electromagnetic-wave radiation direction from the reader/writer antenna.

CITATION LIST

Patent Literature

Patent Literature 1

Japanese Unexamined Patent Application Publication No. 2008-288784

SUMMARY OF INVENTION

Technical Problem

In the technology according to Patent Literature 1, when there is an obstacle formed by metal and the like in front of the reader/writer antenna, there is a possibility that the electromagnetic waves from the reader/writer antenna do not reach a wireless tag (RFID tag) behind the obstacle. Therefore, in the technology according to Patent Literature 1, there is a possibility that the information cannot be efficiently read from the wireless tag.

The present disclosure has been made in order to solve the aforementioned problem and the aim of the present disclosure is to provide a reading apparatus capable of efficiently reading information from an RFID tag.

Solution to Problem

A reading apparatus according to the present disclosure includes: a casing having a reflective surface in at least a part of an inner side; and an antenna provided in the casing and used to read information from an RFID tag. In the reading apparatus, the antenna is disposed in vicinity of the reflective surface having two or more normal lines at different angles, and radiates an electromagnetic wave toward at least a direction that is not parallel to directions of the normal lines.

Advantageous Effects of Invention

According to the present disclosure, the reading apparatus capable of efficiently reading the information from the RFID tag can be provided.

DESCRIPTION OF EMBODIMENTS

Outline of Example Embodiments According to Present Disclosure

Figure 1:
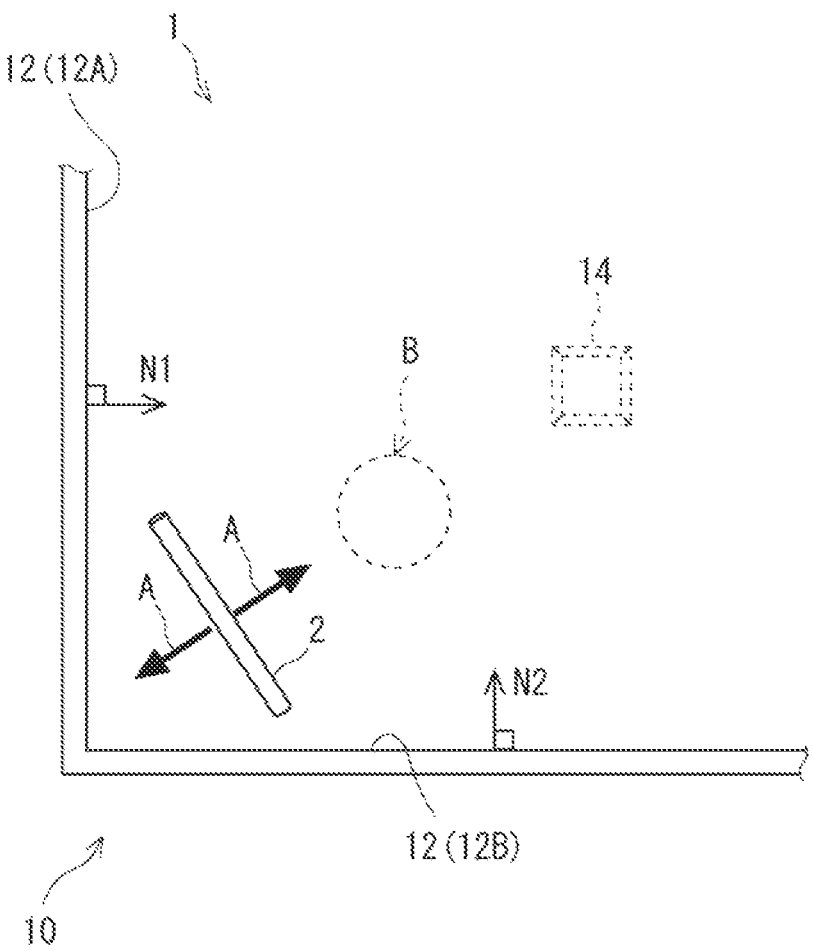
FIG. 1 is a view illustrating an outline of a reading apparatus according to an example embodiment of the present disclosure.

Prior to the description of example embodiments of the present disclosure, an outline of the example embodiments according to the present disclosure is described. FIG. 1 is a view illustrating an outline of a reading apparatus 1 according to the example embodiment of the present disclosure. The reading apparatus 1 includes at least one antenna 2 and a casing 10. The casing 10 has reflective surfaces 12 in at least a part of the inner side. The antenna 2 is provided in the casing 10, and is used to read information from an RFID tag. The antenna 2 is disposed in the vicinity of reflective surfaces 12A and 12B having two or more normal lines N1 and N2 at different angles with respect to the radiation direction (indicated by an arrow A) of the antenna 2. In other words, the antenna 2 is disposed in the vicinity of the reflective surfaces 12A and 12B having the two or more normal lines N1 and N2 at different angles, and radiates electromagnetic waves toward at least a direction that is not parallel to the direction of the normal lines N1 and N2.

In the reading apparatus 1 according to the present example embodiment, the antenna 2 is disposed in the vicinity of reflective surfaces 12A and 12B having two or more normal lines at different angles with respect to the radiation direction of the antenna 2. As a result, the electromagnetic waves radiated from the antenna 2 may be reflected by the reflective surfaces 12A and 12B, and reach a side of the antenna 2 that is opposite to the reflective surfaces 12A and 12B. Therefore, even when there is an obstacle in front of the antenna 2 (the side opposite to the reflective surfaces 12A and 12B; a region indicated by an arrow B) and the RFID tag 14 is behind the obstacle, the electromagnetic waves radiated from the antenna 2 may reach the RFID tag 14. Therefore, information can be read from the RFID tag 14 regardless of the position of the RFID tag 14. In other words, there is no need to frequently move the RFID tag 14 such that the antenna 2 can read information from the RFID tag 14. The RFID tag 14 may receive both of direct waves directly radiated from the antenna 2 and reflected waves reflected by the reflective surfaces 12. As a result, the electric power supplied to the RFID tag 14 can be increased. Therefore, the reading apparatus 1 according to the present example embodiment can efficiently read information from the RFID tag 14.

The reflective surfaces 12 illustrated in FIG. 1 are illustrated so as to be formed by planar surfaces as a matter of convenience, but the reflective surfaces 12 are not limited to planar surfaces and may have curved surfaces. The reflective surfaces 12 (the reflective surfaces 12A and 12B) may be formed by curved surfaces and formed to be physically continuous with each other. Even in this case, the reflective surfaces 12 have two or more normal lines at different angles with respect to the radiation direction of the antenna 2. In other words, the antenna 2 is disposed in the vicinity of the reflective surfaces 12 having two or more normal lines at different angles, and radiates electromagnetic waves toward a direction that is not parallel to the direction of the normal lines.

First Example Embodiment

An example embodiment is described below with reference to the drawings. In order to clarify the description, the description and the drawings below are omitted and simplified, as appropriate. In each of the drawings, the same reference characters (i.e., numerals or symbols) are applied to the same elements, and overlapping descriptions are omitted as needed.

Figure 2:
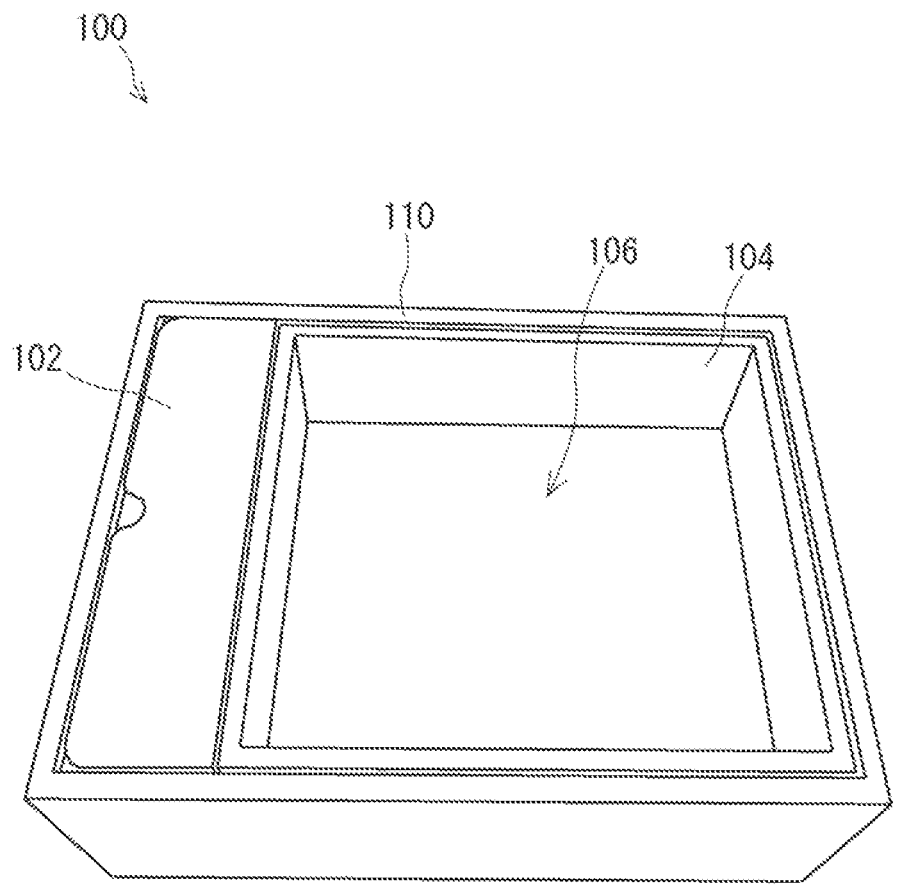
FIG. 2 is a view illustrating an RFID reading apparatus according to a first example embodiment.
Figure 3:
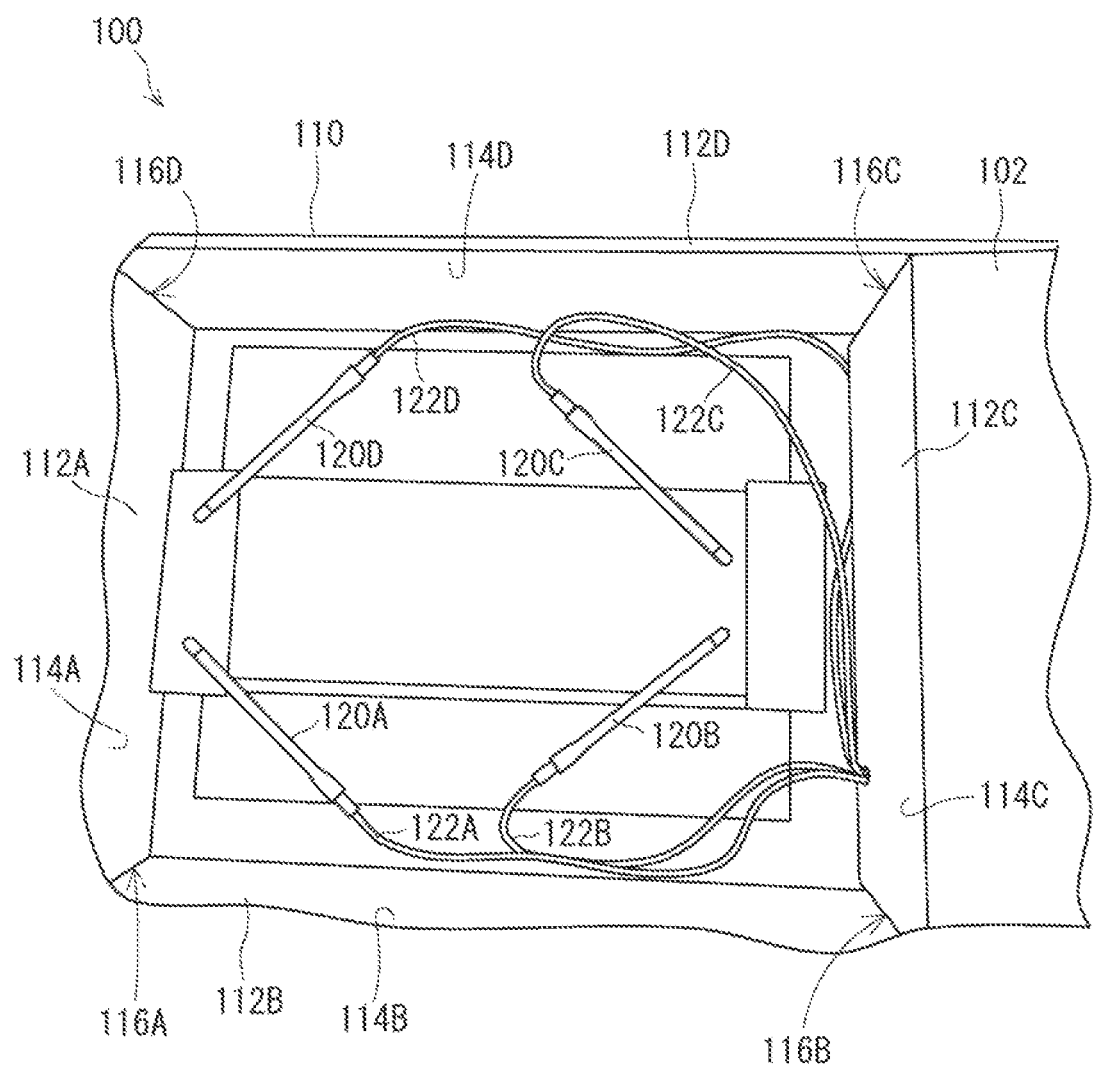
FIG. 3 is a view illustrating the RFID reading apparatus according to the first example embodiment.
Figure 4:
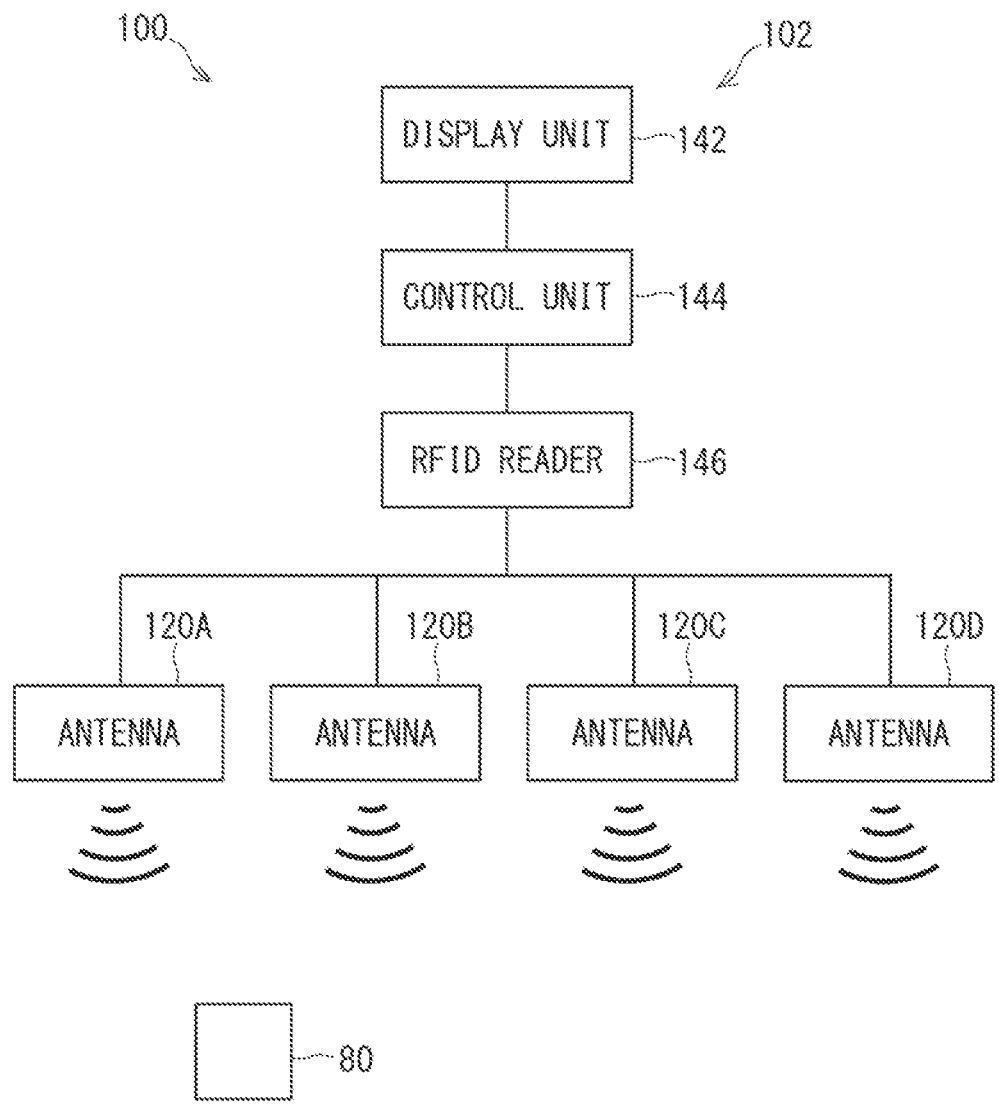
FIG. 4 is a diagram illustrating the RFID reading apparatus according to the first example embodiment.

FIG. 2 to FIG. 4 are views and a diagram illustrating an RFID reading apparatus 100 according to the first example embodiment. FIG. 2 and FIG. 3 are bird's-eye views of the RFID reading apparatus 100 seen from above. FIG. 4 is a block diagram illustrating the configuration of the RFID reading apparatus 100. The RFID reading apparatus 100 corresponds to the reading apparatus 1 illustrated in FIG. 1.

As illustrated in FIG. 2, the RFID reading apparatus 100 includes an information processing unit 102, a cover 104, and a casing 110. The cover 104 is disposed in the casing 110. By the cover 104, an article accommodating portion 106 that accommodates an article to which an RFID tag is attached is formed. As it is understood from FIG. 3 described below, antennas 120 are disposed below the cover 104. The cover 104 is formed by a material that transmits electromagnetic waves radiated from the antennas 120. FIG. 2 illustrates the RFID reading apparatus 100 in a state in which an upper surface is opened, but the upper surface may be closed. In other words, a wall surface may be formed in the upper surface.

FIG. 3 is a view illustrating the RFID reading apparatus 100 in a state in which the cover 104 is removed. In FIG. 3, a state in which the cover 104 is removed is illustrated for the sake of description, but the cover 104 does not necessarily need to be removable in the actual RFID reading apparatus 100. The antennas 120 are provided in the casing 110 as illustrated in FIG. 3. The antennas 120 are disposed below the cover 104.

In the example illustrated in FIG. 3, the RFID reading apparatus 100 includes four antennas 120A, 120B, 120C, and 120D. The antennas 120A, 120B, 120C, and 120D are connected to the information processing unit 102 via wiring 122A, 122B, 122C, and 122D. In the example illustrated in FIG. 3, the antennas 120A, 120B, 120C, and 120D radiate linearly polarized electromagnetic waves. The antennas 120A, 120B, 120C, and 120D are monopole antennas, for example. The antennas 120 radiate electromagnetic waves in directions perpendicular to longitudinal directions thereof.

As illustrated in FIG. 4, the RFID reading apparatus 100 includes the antennas 120 and the information processing unit 102. The information processing unit 102 includes a display unit 142, a control unit 144, and an RFID reader 146. The control unit 144 controls the operation of the display unit 142 and the RFID reader 146. The control unit 144 has a function as a computer, for example. The RFID reader 146 controls the antennas 120 and causes electromagnetic waves obtained by modulating a signal including a command for reading information from the RFID tag to be radiated.

The antennas 120 radiate electromagnetic waves (radio waves) by the control of the information processing unit 102. When an article to which an RFID tag 80 is attached is accommodated in the article accommodating portion 106, electromagnetic waves radiated from any of the antennas 120A, 120B, 120C, and 120D may reach the RFID tag 80. To the RFID tag 80 that has received the electromagnetic waves, electric power is supplied by the electromagnetic waves. A control unit (not shown) of the RFID tag 80 extracts information such as ID information of the article from a built-in memory (not shown). The RFID tag 80 radiates electromagnetic waves obtained by modulating a signal indicating information. When the antennas 120 receive the electromagnetic waves from the RFID tag 80, the RFID reader 146 performs demodulation processing on the electromagnetic waves and acquires information stored in the RFID tag 80. The control unit 144 causes the display unit 142 to display an image relating to the acquired information (an ID of the article and the like). The RFID reader 146 may function as an RFID reader/writer capable of writing information to a memory of the RFID tag 80.

The RFID reader 146 may perform control such that the antennas 120A, 120B, 120C, and 120D radiate electromagnetic waves by time-sharing. In other words, the RFID reader 146 switches the radiation time of each of the antennas 120A, 120B, 120C, and 120D at short time intervals. As a result, the antennas 120A, 120B, 120C, and 120D are controlled so as not to simultaneously radiate electromagnetic waves. For example, when the antenna 120A is radiating electromagnetic waves, the other antennas 120B, 120C, and 120D do not radiate electromagnetic waves.

As illustrated in FIG. 3, the casing 110 has side walls 112A, 112B, 112C, and 112D. On the inner side of the side walls 112A, 112B, 112C, and 112D, reflective surfaces 114A, 114B, 114C, and 114D are provided, respectively. Reflective surfaces 114 are formed by a material that reflects electromagnetic waves. For example, the reflective surfaces 114 may be formed by metal or may be formed by cloth and the like that reflect electromagnetic waves. In the first example embodiment, the side walls 112 and the reflective surfaces 114 are formed by substantially planar surfaces. However, the side walls 112 and the reflective surfaces 114 do not necessarily need to be formed by substantially planar surfaces.

A corner portion 116A is formed by the side wall 112A and the side wall 112B (the reflective surface 114A and the reflective surface 114B). In other words, the corner portion 116A is formed between the side wall 112A and the side wall 112B. Similarly, a corner portion 116B is formed by the side wall 112B and the side wall 112C (the reflective surface 114B and the reflective surface 114C). In other words, the corner portion 116B is formed between the side wall 112B and the side wall 112C. A corner portion 116C is formed by the side wall 112C and the side wall 112D (the reflective surface 114C and the reflective surface 114D). In other words, the corner portion 116C is formed between the side wall 112C and the side wall 112D. A corner portion 116D is formed by the side wall 112D and the side wall 112A (the reflective surface 114D and the reflective surface 114A). In other words, the corner portion 116D is formed between the side wall 112D and the side wall 112A.

The antenna 120A is disposed in the vicinity of the corner portion 116A. The antenna 120B is disposed in the vicinity of the corner portion 116B. The antenna 120C is disposed in the vicinity of the corner portion 116C. The antenna 120D is disposed in the vicinity of the corner portion 116D.

The antenna 120A radiates electromagnetic waves toward a direction that is not parallel to the direction of the normal line of the reflective surface 114A and the direction of the normal line of the reflective surface 114B. Similarly, the antenna 120B radiates electromagnetic waves toward a direction that is not parallel to the direction of the normal line of the reflective surface 114B and the direction of the normal line of the reflective surface 114C. The antenna 120C radiates electromagnetic waves toward a direction that is not parallel to the direction of the normal line of the reflective surface 114C and the direction of the normal line of the reflective surface 114D. The antenna 120D radiates electromagnetic waves toward a direction that is not parallel to the direction of the normal line of the reflective surface 114D and the direction of the normal line of the reflective surface 114A. Therefore, the antennas 120 are disposed in the vicinity of the reflective surfaces 114 having two or more normal lines at different angles with respect to the radiation directions thereof. In other words, the antennas 120 are disposed in the vicinity of the reflective surfaces 114 having two or more normal lines at different angles, and radiate electromagnetic waves toward at least a direction that is not parallel to the directions of the normal lines. The expression of "radiate electromagnetic waves toward (at least) a direction that is not parallel to the directions of the normal lines" does not mean to exclude the radiation of electromagnetic waves in a direction parallel to the directions of the normal lines.

Figure 5:
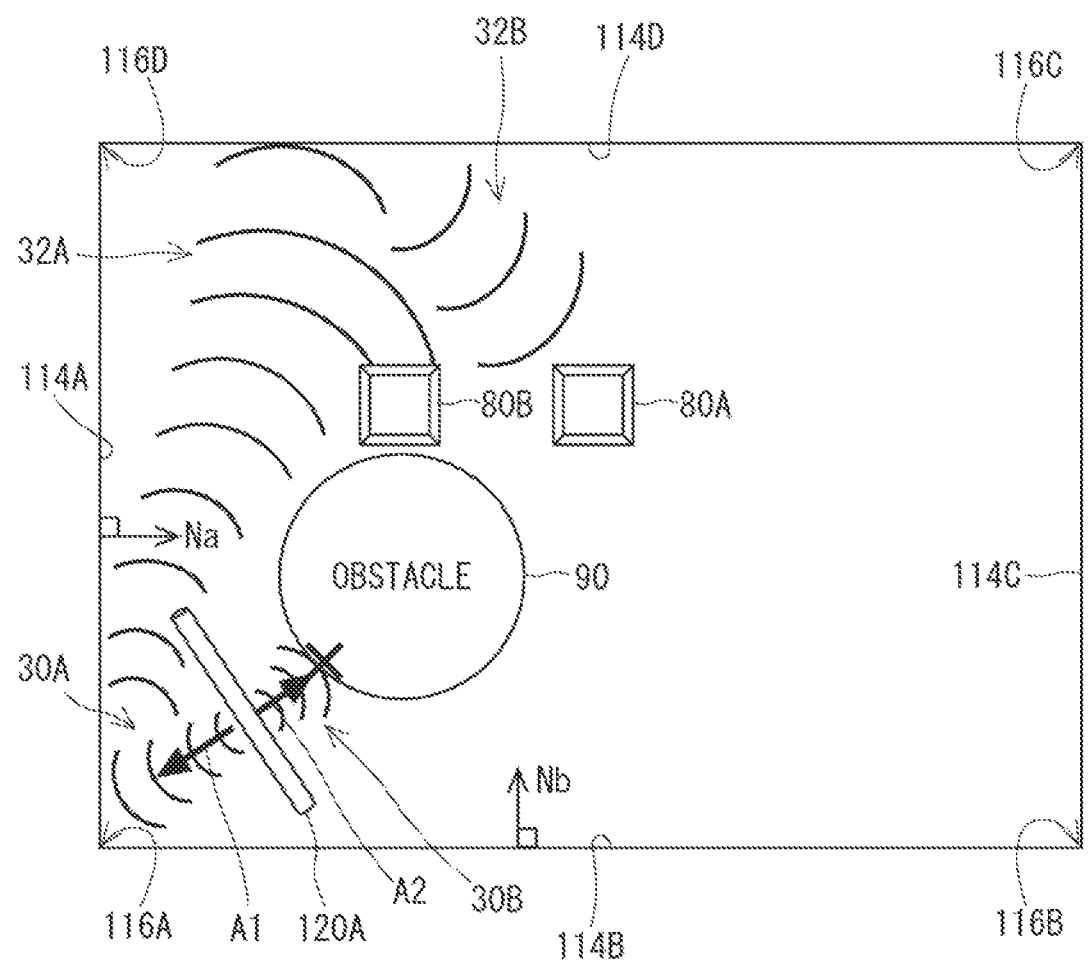
FIG. 5 is a view exemplifying a state of electromagnetic waves radiated from an antenna in the RFID reading apparatus according to the first example embodiment.
Figure 6:
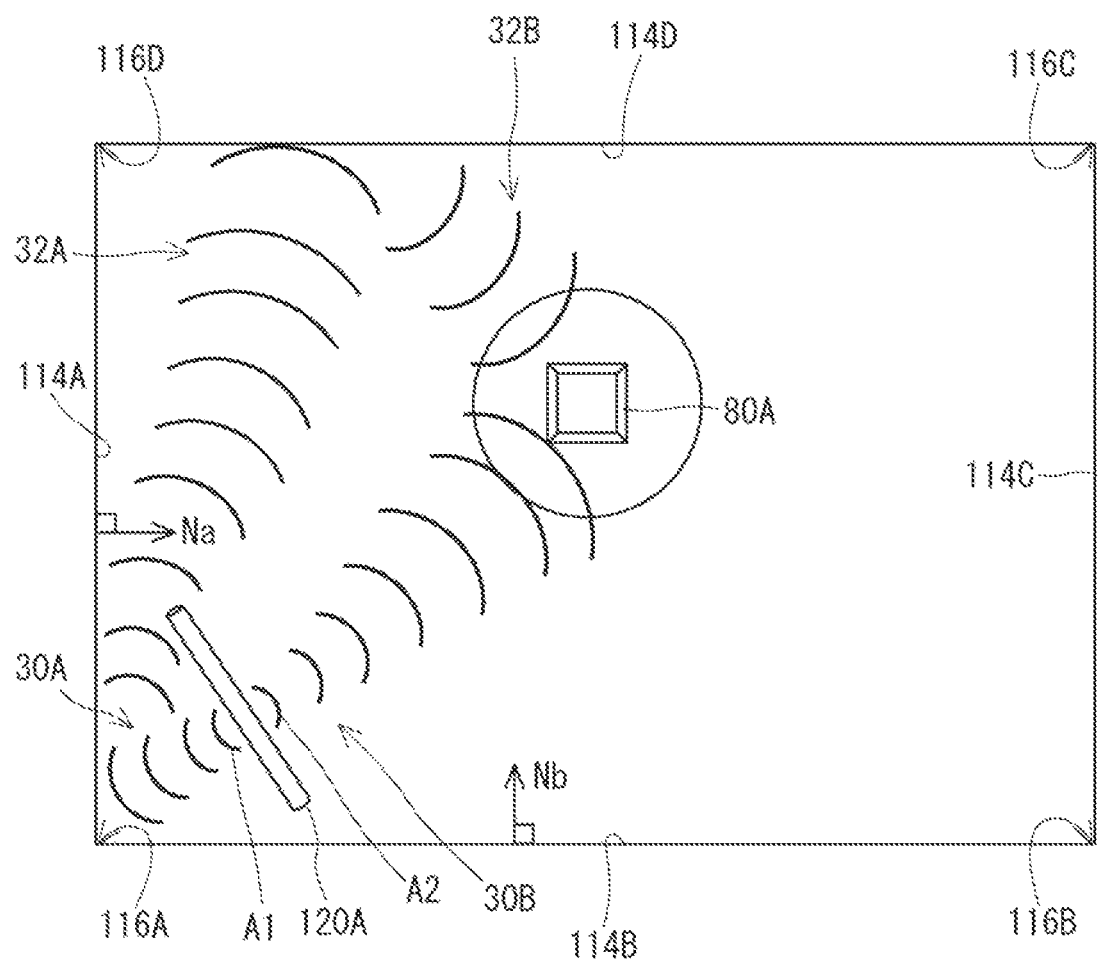
FIG. 6 is a view exemplifying a state of the electromagnetic waves radiated from the antenna in the RFID reading apparatus according to the first example embodiment.

FIG. 5 and FIG. 6 are views exemplifying states of the electromagnetic waves radiated from the antennas 120 in the RFID reading apparatus 100 according to the first example embodiment. FIG. 5 and FIG. 6 illustrate the vicinity of the corner portion 116A and the antenna 120A, but the same applies to the other corner portions 116 and the antennas 120.

As illustrated in FIG. 5 and FIG. 6, the antenna 120A radiates electromagnetic waves (radiation waves 30) toward directions (indicated by arrows A1 and A2) that are not parallel to the direction (indicated by an arrow Na) of the normal line of the reflective surface 114A and the direction (indicated by an arrow Nb) of the normal line of the reflective surface 114B. The antenna 120A radiates electromagnetic waves (radiation waves 30A) toward the side of the corner portion 116A as indicated by the arrow A1, and radiates electromagnetic waves (radiation waves 30B) toward the side opposite to the corner portion 116A as indicated by the arrow A2. At this time, the radiation waves 30A radiated in the direction indicated by the arrow A1 is reflected by the corner portion 116A. As a matter of convenience, the center side (the side indicated by the arrow A2) of the casing 110 with respect to the antenna 120A is referred to as "the front side of the antenna 120A". The front side of the antenna 120A is the side opposite to the corner portion 116A (the reflective surface 114A and the reflective surface 114B) with respect to the antenna 120A. The side (the side indicated by the arrow A1) of the corner portion 116A with respect to the antenna 120A is referred to as "the rear side of the antenna 120A". Therefore, radiation waves 30A are radiated to the rear side of the antenna 120A, and the radiation waves 30B are radiated to the front side of the antenna 120A.

As described above, the directions of the normal lines of the reflective surface 114A and the reflective surface 114B forming the corner portion 116A are different from each other, and the radiation direction (indicated by the arrow A1) of the electromagnetic waves radiated from the antenna 120A are not parallel to the directions of the normal lines. Due to the nature of the waves, the electromagnetic waves propagate in the radiation direction from the radiation position while spreading in the lateral direction. Therefore, reflection waves 32A generated as a result of the radiation waves 30A radiated to the rear side of the antenna 120A being reflected by the corner portion 116A (the reflective surface 114A and the reflective surface 114B) may reach the front side of the antenna 120A. In other words, the antenna 120A is disposed such that the reflection waves generated when the radiation waves 30A radiated from the antenna 120A are reflected by the reflective surfaces 114A and 114B having the two or more normal lines Na and Nb at different angles may reach the side opposite to the reflective surfaces with respect to the antenna 120A.

In the example illustrated in FIG. 5 and FIG. 6, the reflection waves 32A may further be reflected by the reflective surface 114D. When the reflection waves 32A are reflected by the reflective surface 114D, reflection waves 32B are generated. As illustrated in FIG. 5 and FIG. 6, the reflection waves 32B may reach the front side of the antenna 120A even more as compared to the reflection waves 32A. The electromagnetic waves (radiation waves) are waves, and hence may actually be reflected in every direction by the reflective surfaces 114, but reflection waves in only one direction are illustrated in FIG. 5 and FIG. 6 as a matter of convenience for the sake of description.

As illustrated in FIG. 5, there is an obstacle 90 that is formed by metal and the like and does not let electromagnetic waves to pass therethrough, for example, on the front side of the antenna 120A. At this time, there is a possibility that the radiation waves 30B radiated to the front side of the antenna 120A cannot reach RFID tags 80A and 80B behind the obstacle 90 due to the obstacle 90.

Meanwhile, the radiation waves 30A radiated to the rear side of the antenna 120A generate the reflection waves 32A at the corner portion 116A, and generate the reflection waves 32B at the reflective surface 114D. The reflection waves 32B may reach the RFID tag 80A. As a result, the RFID tag 80A radiates electromagnetic waves including information such as an ID of an article stored in a memory. At this time, the electromagnetic waves radiated from the RFID tag 80A are reflected by the reflective surface 114D and the corner portion 116A and reach the antenna 120A as with the electromagnetic waves (radiation waves 30A, the reflection waves 32A, and the reflection waves 32B) radiated from the antenna 120A. In other words, the electromagnetic waves radiated from the RFID tag 80A reach the antenna 120A by a path in a direction opposite to the traveling path of the electromagnetic waves radiated from the antenna 120A. In this way, the antenna 120A can receive the electromagnetic waves radiated from the RFID tag 80A, and hence the RFID reader 146 can acquire information stored in the RFID tag 80A.

The reflection waves 32A generated when the radiation waves 30A radiated to the rear side of the antenna 120A are reflected by the corner portion 116A may come around behind the obstacle 90 by diffraction. Therefore, the reflection waves 32A may reach the RFID tag 80B. As a result, as with the RFID tag 80A, the RFID tag 80B radiates electromagnetic waves including information such as an ID of an article stored in a memory. The antenna 120A receives the electromagnetic waves radiated from the RFID tag 80B. As a result, the RFID reader 146 acquires the information stored in the RFID tag 80B.

As illustrated in FIG. 6, when there are no obstacles in front of the antenna 120A, the radiation waves 30B reach the RFID tag 80A as direct waves. The reflection waves 32B generated by the radiation waves 30A may also reach the RFID tag 80A. As above, in the RFID reading apparatus 100 according to the first example embodiment, the electromagnetic waves of the antenna 120A may reach the RFID tag 80A from a plurality of directions. The polarization plane may be tilted by the reflection, and hence the polarization direction of the reflection waves 32B may have an angle that is different from that of the polarization direction of the radiation waves 30B that are direct waves.

As described above, in the RFID reading apparatus 100 according to the first example embodiment, the reflective surfaces 114 are provided on at least a part of the inner sides of the side walls 112 of the casing 110. The antennas 120 are disposed in the vicinity of the corner portions 116 formed by the reflective surfaces 114. The antennas 120 are disposed in the vicinity of the reflective surfaces 114 (the corner portions 116) having two or more normal lines at different angles, and radiate electromagnetic waves toward at least a direction that is not parallel to the directions of the normal lines. As a result, the electromagnetic waves radiated to the side of the reflective surfaces 114 (the corner portions 116) from the antennas 120 may be reflected by the plurality of reflective surfaces 114 in a large number of directions. As a result, the reflection waves may reach the front side of the antennas 120.

Therefore, as illustrated in FIG. 5, even when the obstacle 90 is in front of the antennas 120, the electromagnetic waves radiated to the rear side of the antennas 120 may be reflected by the reflective surfaces 114, and the reflection waves 32 generated thereby may reach the RFID tag 80 behind the obstacle 90. Therefore, even when the obstacle 90 exists in the casing 110, the possibility of the information being read from the RFID tag 80 increases without moving the RFID tag 80 so as to enable the reading. Therefore, the RFID reading apparatus 100 according to the first example embodiment can efficiently read information from the RFID tag.

As illustrated in FIG. 6, the electromagnetic waves (the radiation waves and the reflection waves) radiated from the antennas 120 may reach the RFID tag 80 from a plurality of directions. As a result, the density of the electromagnetic waves in the RFID tag 80 may become high. Therefore, the electric power supply that is supplied to the RFID tag 80 can be increased. Therefore, information from the RFID tag 80 can be read even when the output of the antennas 120 (reader side) is not high. The output of the antennas 120 can be suppressed, and hence erroneous reading from the RFID tag 80 around the RFID reading apparatus 100 can be suppressed. In other words, when the output of the antennas 120 is increased, there is a possibility that the electromagnetic waves radiated from the antennas 120 leak to the outside of the casing 110 from a surface on which the reflective surfaces 114 are not provided. In this case, when the electromagnetic waves reach the RFID tag 80 on the outside of the casing 110, there is a possibility that information is read from the RFID tag 80. Meanwhile, in the present example embodiment, as described above, the leakage of the electromagnetic waves to the outside of the casing 110 is suppressed, and hence erroneous reading can be suppressed. Therefore, the RFID reading apparatus 100 according to the first example embodiment can efficiently read information from the RFID tag.

In general, the polarized waves of an antenna of the RFID tag are linearly polarized waves. Therefore, the decrease of the reception electric field due to the orthogonality of the polarized waves in the RFID tag caused by the orientation of the antenna of the RFID tag is prevented by causing the polarized waves of an antenna on the reader side to be circularly polarized waves. In other words, there is a possibility that the reception electric field does not become high to the extent being readable by the RFID tag depending on the orientation of the antenna of the RFID tag when the polarization waves of the antenna on the reader side are caused to be linearly polarized waves. Meanwhile, in the RFID reading apparatus 100 according to the first example embodiment, the reflection waves 32 at the reflective surfaces 114 may reach the RFID tag 80. The polarization direction of the reflection waves may have an angle that is different from that of the polarization direction of the radiation waves 30B that are direct waves due to reflection, and hence electromagnetic waves in polarization directions at a large number of angles may reach the RFID tag 80. Therefore, even when the polarized waves of the antenna on the reader side are linearly polarized waves, the occurrence of the problem of the orthogonality of the polarized waves in the RFID tag due to the orientation of the antenna of the RFID tag can be suppressed. Therefore, a stable reception electric field can be secured regardless of the orientation of the RFID tag 80. Therefore, the RFID reading apparatus 100 according to the first example embodiment can efficiently read information from the RFID tag.

In the RFID reading apparatus 100 according to the first example embodiment, the antennas 120 are disposed in the vicinity of the plurality of corner portions 116, respectively. As a result, the possibility of the electromagnetic waves (at least one of the direct waves and the reflection waves) radiated from any of the plurality of antennas 120 reaching the RFID tag 80 increases regardless of which position in the casing 110 the RFID tag 80 is in. Therefore, the RFID reading apparatus 100 according to the first example embodiment can efficiently read information from the RFID tag.

Second Example Embodiment

Next, a second example embodiment is described. In order to clarify the description, the description and the drawings below are omitted and simplified, as appropriate. In each of the drawings, the same reference characters are applied to the same elements, and overlapping descriptions are omitted as needed.

Figure 7:
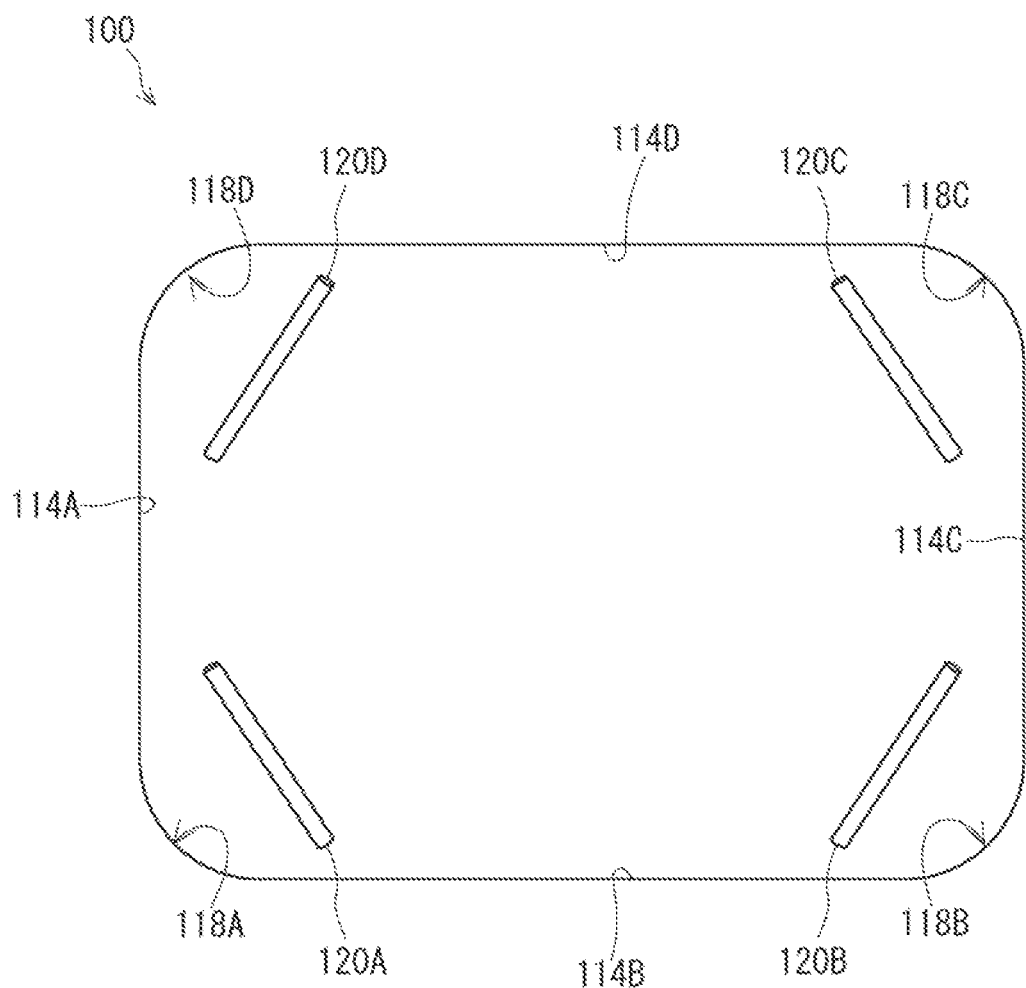
FIG. 7 is a view illustrating an RFID reading apparatus according to a second example embodiment.

FIG. 7 is a view illustrating the RFID reading apparatus 100 according to the second example embodiment. FIG. 7 corresponds to FIG. 3 according to the first example embodiment. However, in FIG. 7, the information processing unit 102 and the wiring 122 are omitted. The side walls of the casing 110 are omitted, and only the reflective surfaces 114 are illustrated. Corner portions 118 are also formed by the reflective surfaces 114 in the second example embodiment.

In the first example embodiment, the reflective surfaces 114 are formed by substantially planar surfaces, and hence the corner portions 116 are discontinuously formed. Meanwhile, in the second example embodiment, the corner portions 118 are formed by curved surfaces. Therefore, the corner portions 118 are continuously and smoothly formed. The antenna 120A is disposed in the vicinity of a corner portion 118A formed by the reflective surface 114A and the reflective surface 114B. Similarly, the antenna 120B is disposed in the vicinity of a corner portion 118B formed by the reflective surface 114B and the reflective surface 114C. The antenna 120C is disposed in the vicinity of a corner portion 118C formed by the reflective surface 114C and the reflective surface 114D. The antenna 120D is disposed in the vicinity of a corner portion 118D formed by the reflective surface 114D and the reflective surface 114A.

The corner portions 118 are formed by continuous curved surfaces, and hence the directions of the normal lines thereof differ for each position in the curved surfaces of the corner portions 118. Therefore, the corner portions 118 are reflective surfaces having two or more normal lines at different angles. Therefore, each antenna 120 radiates electromagnetic waves toward at least a direction that is not parallel to the direction of the normal line of the corner portion 118 (reflective surface).

As a result, the electromagnetic waves radiated from the antennas 120 may be reflected by the corner portions 118 in a large number of directions. Therefore, the reflection waves generated as a result of the radiation waves radiated to the rear side of the antenna 120 being reflected by the corner portion 118 may reach the front side of the antenna 120. Therefore, as with the first example embodiment, the RFID reading apparatus 100 according to the second example embodiment can efficiently read information from the RFID tag.

In the example illustrated in FIG. 5 to FIG. 7, the reflective surfaces 114 have planar surfaces, but the present disclosure is not limited to such configuration. All of the reflective surfaces 114 (the side walls 112) may be formed by curved surfaces. For example, the reflective surfaces 114 (the side walls 112) may be formed in a cylindrical shape.

Modification Example

The present invention is not limited to the abovementioned example embodiments, and can be changed, as appropriate, without departing from the gist. For example, in the abovementioned example embodiment, the polarization waves of the antennas are linearly polarized waves, but the polarization waves of the antennas may be circularly polarized waves. The size of the antennas of the linearly polarized waves can be caused to be smaller than that of the antennas of the circularly polarized waves, and hence the structure of the RFID reading apparatus 100 can be simplified by using the antennas of the linearly polarized waves.

In the abovementioned example embodiment, the antennas are disposed such that the longitudinal directions of the antennas become substantially horizontal, but the present disclosure are not limited to such configuration. The orientation of the longitudinal directions of the antennas are freely selected. For example, the antennas may be disposed such that the longitudinal directions of the antennas become substantially vertical.

In the abovementioned example embodiment, the casing 110 has four side walls, but the present disclosure is not limited to such configuration. The shape of the casing 110 is not limited to a rectangular shape. One side wall of the casing 110 may be removed. In other words, one side surface may be an opening. For example, in a usage aspect in which a clerk and a customer face each other and the RFID reading apparatus 100 exists between the clerk and the customer, the side wall on the clerk side may be an opening. The upper surface of the casing 110 may be an opening, and the article may be able to be taken in and out. As described above, in the present example embodiments, the output of antennas can be suppressed. Therefore, even when there is an opening in the casing 110, a case where electromagnetic waves leak from the opening can be suppressed.

A wall or a lid may be provided so as to cover the upper surface of the casing 110. In this case, the antennas may be disposed on the upper surface side of the casing 110. In the abovementioned example embodiment, the antennas are disposed in the vicinity of the plurality of corner portions, respectively, but the present disclosure is not limited to such configuration. The antennas 120 do not necessarily need to be provided in correspondence to all of the plurality of corner portions. At least one antenna only needs to be disposed in the vicinity of at least one corner portion.

The invention of the present application has been described with reference to the example embodiments above, but the invention of the present application is not limited by the above. In the configuration and the details of the invention of the present application, various changes that may be understood by a person skilled in the art can be made within the scope of the invention.

The present application claims priority from Japanese Patent Application No. 2019-124183 filed on Jul. 3, 2019, the entire disclosure of which is incorporated herein by reference.

REFERENCE SIGNS LIST

1 READING APPARATUS
2 ANTENNA
10 CASING
12 REFLECTIVE SURFACE
14 RFID TAG
30 RADIATION WAVE
32 REFLECTION WAVE
80 RFID TAG
100 RFID READING APPARATUS
102 INFORMATION PROCESSING UNIT
106 ARTICLE ACCOMMODATING PORTION
110 CASING
112 SIDE WALL
114 REFLECTIVE SURFACE
116 CORNER PORTION
118 CORNER PORTION
120 ANTENNA
142 DISPLAY UNIT
144 CONTROL UNIT
146 RFID READER

What is claimed is:

1. A reading apparatus comprising:
a casing having a reflective surface in at least a part of an inner side; and
an antenna provided in the casing and used to read information from an RFID tag located inside the casing,
wherein the antenna is disposed in vicinity of a corner portion formed by the reflective surface having two or more normal lines at different angles, and that radiates an electromagnetic wave towards a first direction towards a side of the corner portion in the casing, and a second direction towards a side opposite to the corner portion and towards a side of a center of the casing, each of the first direction and second direction not being parallel to the normal lines, and the antenna is disposed such that a reflection wave generated when the electromagnetic wave radiated from the antenna towards the first direction is reflected by the corner portion reaches a position inside the casing in which the RFID tag can be located, the position being at a side opposite to the corner portion with respect to the antenna and that the electromagnetic wave radiated towards the second direction reaches.

2. The reading apparatus according to claim 1, wherein the antenna radiates a linearly polarized electromagnetic wave.

3. The reading apparatus according to claim 1, wherein the corner portion is one of a plurality of corner portions of the casing formed by the reflective surface, and the antenna is disposed in vicinity of each of the plurality of corner portions.

4. The reading apparatus according to claim 1, wherein the antenna is controlled so as to radiate the electromagnetic wave by time-sharing.

* * * * *